(12) United States Patent
Liu

(10) Patent No.: US 11,218,951 B2
(45) Date of Patent: Jan. 4, 2022

(54) METHOD AND APPARATUS FOR OBTAINING AND TRANSMITTING SYSTEM INFORMATION

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 128 days.

(21) Appl. No.: 16/475,560

(22) PCT Filed: Jan. 9, 2017

(86) PCT No.: PCT/CN2017/070650
§ 371 (c)(1),
(2) Date: Jul. 2, 2019

(87) PCT Pub. No.: WO2018/126479
PCT Pub. Date: Jul. 12, 2018

(65) Prior Publication Data
US 2019/0342825 A1    Nov. 7, 2019

(51) Int. Cl.
*H04W 48/16* (2009.01)
*H04B 7/06* (2006.01)
(Continued)

(52) U.S. Cl.
CPC .......... *H04W 48/16* (2013.01); *H04B 7/0617* (2013.01); *H04L 5/0055* (2013.01);
(Continued)

(58) Field of Classification Search
CPC ... H04W 48/16; H04W 16/28; H04W 72/046; H04W 56/001
(Continued)

(56) References Cited

U.S. PATENT DOCUMENTS 10,045,286 B2 *  8/2018  Huang ............ H04W 36/00835
10,374,819 B2 *  8/2019  Yin ...................... H04L 12/189
(Continued)

FOREIGN PATENT DOCUMENTS

CN       1520220 A     8/2004
CN     101217689 A     7/2008
(Continued)

OTHER PUBLICATIONS

State Intellectual Property Office of the People's Republic of China, Office Action and Search Report Issued in Application No. 201780000014.5, dated Sep. 24, 2019, 13 pages, (Submitted with Machine Translation).
(Continued)

*Primary Examiner* — Congvan Tran
(74) *Attorney, Agent, or Firm* — Arch & Lake LLP

(57) ABSTRACT

A method and an apparatus for obtaining and transmitting system information are provided by the present disclosure. The method of obtaining the system information includes: a function of detecting a first target beam is turned on under a preset trigger condition, where the first target beam is a beam that carries target system information and is emitted by a base station to shared initiating equipment in response to a system information request transmitted by the shared initiating equipment; the first target beam is detect before a preset state; and the target system information is obtained according to the first target beam when the first target beam is received before the preset state. With the method of obtaining the system information, acquisition latency of the target system information is effectively shortened and utilization of air interface resources is improved.

10 Claims, 19 Drawing Sheets

(51) Int. Cl.
*H04L 5/00* (2006.01)
*H04W 16/28* (2009.01)
*H04W 56/00* (2009.01)
*H04W 72/04* (2009.01)

(52) U.S. Cl.
CPC ......... *H04W 16/28* (2013.01); *H04W 56/001* (2013.01); *H04W 72/046* (2013.01); *H04W 72/048* (2013.01)

(58) Field of Classification Search
USPC .................. 455/434, 436–444; 370/331–332
See application file for complete search history.

(56) References Cited

U.S. PATENT DOCUMENTS

| | | | | |
|---|---|---|---|---|
| 2012/0063366 | A1* | 3/2012 | Long | H04W 76/12 370/259 |
| 2014/0177607 | A1 | 6/2014 | Ying | |
| 2015/0085825 | A1* | 3/2015 | Ishihara | H04W 52/0216 370/331 |
| 2016/0198390 | A1* | 7/2016 | Aminaka | H04W 16/32 370/328 |
| 2016/0234759 | A1 | 8/2016 | Kubota et al. | |
| 2016/0286555 | A1 | 9/2016 | Aris | |
| 2016/0309536 | A1* | 10/2016 | Maeda | H04W 48/16 |
| 2017/0142766 | A1* | 5/2017 | Kim | H04W 48/20 |

FOREIGN PATENT DOCUMENTS

| | | | |
|---|---|---|---|
| CN | 101753226 | A | 6/2010 |
| CN | 102647723 | A | 8/2012 |
| CN | 103138816 | A | 6/2013 |
| CN | 103220704 | A | 7/2013 |
| CN | 103248450 | A | 8/2013 |
| CN | 103607233 | A | 2/2014 |
| CN | 104184561 | A | 12/2014 |
| CN | 105068070 | A | 11/2015 |
| CN | 105493547 | A | 4/2016 |
| CN | 105637952 | A | 6/2016 |
| CN | 105812035 | A | 7/2016 |
| CN | 106171011 | A | 11/2016 |
| KR | 20050059304 | A | 6/2005 |
| KR | 20060115819 | A | 11/2006 |
| KR | 20070053333 | A | 5/2007 |
| WO | 2013149189 | A1 | 10/2013 |
| WO | 2014137174 | A1 | 9/2014 |
| WO | 2015191200 | A1 | 12/2015 |
| WO | 2016068521 | A1 | 5/2016 |

OTHER PUBLICATIONS

ISA State Intellectual Property Office of the People's Republic of China, Written Opinion of the International Searching Authority Issued in Application No. PCT/CN2017/070650, dated Sep. 28, 2017, WIPO, 4 pages.
International Search Report (including English translation) and Written Opinion issued in PCT/CN2017/070650, dated Sep. 28, 2017, 8 pages.
State Intellectual Property Office of the People's Republic of China, Office Action and Search Report Issued in Application No. 201710016511.6, dated May 7, 2019, 11 pages, (Submitted with Machine Translation).
Extended European Search Report issued in EP Application No. 17890371.2, dated Mar. 13, 2020, (14p).
Second Chinese Office Action issued in Chinese Application No. 2017800000145 dated May 18, 2020 with English translation, (10p).
European Patent Office, Extended European Partial Search Report issued in EP Application No. 17890371.2 dated Dec. 3, 2019, (16p).
Ericsson, "NR System Information Distribution—Principles and Example", 3GPP TSG-RAN WG2 #95bis, Kaohsiung, Tiwan, Oct. 10-14, 2016, Tdoc R2-166773, (5p).
Intellectual property India, Office Action issued in Application No. 201947030605, dated Jan. 28, 2021, 6 pages (Submitted with Partial Machine Translation).
European Patent Office, Office Action issued in Application No. 17890371.2, dated Jan. 25, 2021, Netherlands, 8 pages.

* cited by examiner

METHOD AND APPARATUS FOR OBTAINING AND TRANSMITTING SYSTEM INFORMATION

CROSS REFERENCE TO RELATED APPLICATIONS

The present application is the U.S. national phase of PCT Application No. PCT/CN2017/070650 filed on Jan. 9, 2017, which is incorporated herein by reference in its entirety.

TECHNICAL FIELD

The present disclosure relates to the field of computer communication technologies, and in particular, to a method and an apparatus for obtaining and transmitting system information.

BACKGROUND

Standardization with 5G, such as new radio (NR) network, is being carried out in $3^{rd}$ Generation Partnership Project (3GPP). One of the key technologies of the 5G network communication system is the beamforming technology. The communication process is substantially as follows: an emitting end, such as the base station (gNB), directionally emits a high-frequency beam of 6 GHz or higher by using a large-scale antenna array to align a location of a receiving end, such as the UE (UE); and after receiving the high-frequency beam, the receiving end establishes a communication connection with the emitting end, thereby transmitting and receiving information through the high-frequency beam.

According to the characteristics of the 5G network information transmission, the system information required by the UE may be substantially classified into three types: a first type of system information, including: a minimum set of system information such as a master information block (MIB), which is continually transmitted, by using a high-frequency beam within a particular frequency band, to the UE within the coverage of the base station signal in a scanning manner according to a preset scheduling period, where the first type of system information has the highest priority; a second type of system information, which may be transmitted according to the requirements of the UE; and a third type of system information, which is exclusive system information.

In the related technologies, the second type of system information are transmitted one by one according to a request sent by the UE. When two or more neighboring UE simultaneously requests to obtain the second type of system information, the system information transmission latency is increased, thereby decreasing the transmission efficiency of the second type of system information.

SUMMARY

To overcome the problems in the related art, examples of the present disclosure provide a method and an apparatus for obtaining and transmitting system information, so as to shorten acquisition latency of the target system information and improve utilization of system air interface resources.

According to a first aspect of examples of the present disclosure, a method of obtaining system information is provided, which is applied to UE and includes:

turning on a function of detecting a first target beam under a preset trigger condition, where the first target beam is a beam that carries target system information and is emitted by a base station to shared initiating equipment in response to a system information request transmitted by the shared initiating equipment;

detecting the first target beam before a preset state; and obtaining the target system information according to the first target beam if the first target beam is received before the preset state.

Optionally, the preset trigger condition includes:

when receiving high-level system information; or when downlink synchronization is successful.

Optionally, the method further includes:

transmitting a system information request to the base station if the first target beam is not received before the preset state;

receiving a second target beam directionally emitted by the base station in response to the system information request transmitted by the UE; and obtaining the target system information according to the second target beam.

Optionally, after receiving the second target beam, the method further includes:

transmitting reception acknowledgement information to the base station.

According to a second aspect of examples of the present disclosure, a method of transmitting system information is provided, which is applied to a base station and includes:

receiving a system information request transmitted by shared initiating equipment; and emitting a target beam carrying target system information to shared receiving equipment according to the system information request, where the shared receiving equipment at least includes the shared initiating equipment.

Optionally, receiving the system information request transmitted by the shared initiating equipment includes:

receiving the system information request transmitted by first equipment, where the system information request includes equipment capability information of the first equipment;

determining a latency attribute of the first equipment according to the equipment capability information; and if the first equipment belongs to latency-insensitive equipment, detecting the system information request transmitted by other equipment within a preset duration.

Optionally, if the base station receives the system information requests transmitted by at least two pieces of the shared initiating equipment, emitting the target beam carrying the target system information to the shared receiving equipment according to the system information request includes:

obtaining at least two request initiating locations by determining an initiating location of each of the system information requests;

determining whether the at least two pieces of the shared initiating equipment are located in a same preset region when the system information requests are initiated according to the at least two request initiating locations;

if the at least two pieces of the shared initiating equipment are located in the same preset region when the system information requests are initiated, performing beam combining according to the at least two request initiating locations and a preset beam coverage to determine a combined beam coverage; and emitting the target beam according to the combined beam coverage.

Optionally, emitting the target beam carrying the target system information to the shared receiving equipment according to the system information request further includes:

if the at least two pieces of the shared initiating equipment are not located in the same preset region when the system information requests are initiated, determining an initial scanning location of the target beam according to the at least two request initiating locations; and performing target beam scanning according to the preset beam coverage from the initial scanning location.

Optionally, if at least two system information requests are successively received by the base station within a preset duration, determining the initial scanning location of the target beam according to the at least two request initiation locations includes:

determining the initial scanning location of the target beam according to a receiving time sequence of each of the system information requests and/or a latency attribute of each piece of the shared initiating equipment;

performing the target beam scanning according to the preset beam coverage from the initial scanning location includes:

when the preset duration is expired, performing the target beam scanning according to the preset beam coverage from the initial scanning location.

Optionally, the method further including:

receiving reception acknowledgement information transmitted by each piece of the shared receiving equipment; and after receiving the reception acknowledgement information transmitted by the shared initiating equipment, stopping emitting the target beam.

According to a third aspect of examples of the present disclosure, an apparatus for obtaining system information is provided, which is applied to UE and includes:

an opening module, configured to turn on a function of detecting a first target beam under a preset trigger condition, where the first target beam is a beam that carries target system information and is emitted by a base station to shared initiating equipment in response to a system information request transmitted by the shared initiating equipment;

a detecting module, configured to detect the first target beam before a preset state; and a first information obtaining module, configured to obtain the target system information according to the first target beam if the first target beam is received before the preset state.

Optionally, the preset trigger condition includes:

when receiving high-level system information; or when downlink synchronization is successful.

Optionally, the apparatus further includes:

a requesting module, configured to transmit a system information request to the base station if the first target beam is not received before the preset state;

a receiving module, configured to receive a second target beam directionally emitted by the base station in response to the system information request transmitted by the UE; and a second information obtaining module, configured to obtain the target system information according to the second target beam.

Optionally, the apparatus further includes:

an acknowledgement module, configured to transmit reception acknowledgement information to the base station.

According to a fourth aspect of examples of the present disclosure, an apparatus for transmitting system information is provided, which is applied to a base station and includes:

a request receiving module, configured to receive a system information request transmitted by shared initiating equipment; and a beam emitting module, configured to emit a target beam carrying target system information to shared receiving equipment according to the system information request, where the shared receiving equipment at least includes the shared initiating equipment.

Optionally, the request receiving module includes:

a request receiving sub-module, configured to receive the system information request transmitted by first equipment, where the system information request includes equipment capability information of the first equipment;

a latency determining sub-module, configured to determine a latency attribute of the first equipment according to the equipment capability information; and a request detecting sub-module, configured to detect the system information request transmitted by other equipment within a preset duration if the first equipment belongs to latency-insensitive equipment.

Optionally, if the base station receives the system information requests transmitted by at least two pieces of the shared initiating equipment, the beam emitting module includes:

a location determining sub-module, configured to obtain at least two request initiating locations by determining an initiating location of each of the system information requests;

a region determining sub-module, configured to determine whether the at least two pieces of the shared initiating equipment are located in a same preset region when the system information requests are initiated according to the at least two request initiating locations;

a beam combining sub-module, configured to perform beam combining according to the at least two request initiating locations and a preset beam coverage to determine a combined beam coverage, if the at least two pieces of the shared initiating equipment are located in the same preset region when the system information requests are initiated; and a first beam emitting sub-module, configured to emit the target beam according to the combined beam coverage.

Optionally, the beam emitting module further includes:

an initial scanning location determining sub-module, configured to determine an initial scanning location of the target beam according to the at least two request initiating locations if the at least two pieces of the shared initiating equipment are not located in the same preset region when the system information requests are initiated; and a second beam emitting sub-module, configured to perform target beam scanning according to the preset beam coverage from the initial scanning location.

Optionally, if at least two system information requests are successively received by the base station within a preset duration, the initial scanning location determining sub-module includes:

an initial scanning location determining unit, configured to determine the initial scanning location of the target beam according to a receiving time sequence of each of the system information requests and/or a latency attribute of each piece of the shared initiating equipment;

the second beam emitting sub-module includes:

an emitting unit, configured to perform the target beam scanning according to the preset beam coverage from the initial scanning location when the preset duration is expired.

Optionally, the apparatus further includes:

an acknowledgement information receiving module, configured to receive reception acknowledgement information transmitted by each piece of the shared receiving equipment; and an emission stopping module, configured to stop emitting the target beam after receiving the reception acknowledgement information transmitted by the shared initiating equipment.

According to a fifth aspect of examples of the present disclosure, an apparatus for obtaining system information is provided, which includes:

a processor;

a memory to store instructions executable by the processor;

where the processor is configured to:

turn on a function of detecting a first target beam under a preset trigger condition, where the first target beam is a beam that carries target system information and is emitted by a base station to shared initiating equipment in response to a system information request transmitted by the shared initiating equipment;

detect the first target beam before a preset state; and obtain the target system information according to the first target beam if the first target beam is received before the preset state.

According to a sixth aspect of examples of the present disclosure, an apparatus for transmitting system information is provided, which includes:

a processor;

a memory to store instructions executable by the processor;

where the processor is configured to:

receive a system information request transmitted by shared initiating equipment; and emit a target beam carrying target system information to shared receiving equipment according to the system information request, where the shared receiving equipment at least includes the shared initiating equipment.

The technical solutions provided in embodiments of the present disclosure may include the following beneficial effects.

In the present disclosure, the UE may start detecting the first target beam carrying the target system information under the preset trigger condition. In this way, the UE may obtain the target system information before the actual needs, the receiving latency of the target system information is 0 with respect to the actual demand moment. In the related art, the UE waits to receive the target system information after transmitting the request, so there is a receiving latency. Therefore, with respect to the related art, the method of obtaining system information provided by the present disclosure effectively shortens the acquisition latency of the target system information. On the other hand, in the present disclosure, the base station performs one-time target beam scanning, such that other UE may share the target system information, which saves the number of times in which the base station initiates the target beam scanning, effectively saves air interface resources and improves the utilization of air interface resources with respect to the related art.

It shall be appreciated that the above general descriptions and the following detailed descriptions are merely illustrative and explanatory and cannot limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
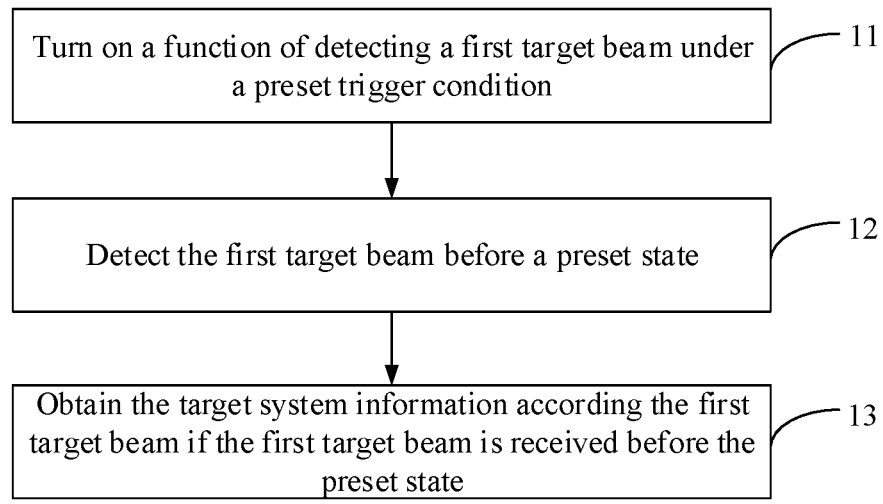
FIG. 1 is a flowchart of a method of obtaining system information according to an example.

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first", "second", "third" and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

The technical solution provided by the present disclosure is applicable to a 5G network or other network communication systems that use high-frequency beams for information transmission. The above-mentioned high-frequency beam may refer to a beam having a frequency of 6 GHz or higher. The subject of execution involved in the present disclosure includes: an emitting end and a receiving end of the high-frequency beam, where the emitting end of the high-frequency beam may be a base station, a sub base station and so on, which are provided with a large-scale antenna array. The receiving end of the high-frequency beam may be UE provided with a smart antenna array. The UE may be a user terminal, a user node, a mobile terminal, a tablet or the like. In a specific implementation process, the emitting end and the receiving end of the high-frequency beam are independent of each other and simultaneously communicate with each other, so as to jointly implement the technical solution provided by the present disclosure.

FIG. 1 is a flowchart of a method of obtaining system information according to an example. The method may be applied to UE in a 5G network and include:

At step 11, a function of detecting a first target beam is turned on under a preset trigger condition.

The first target beam is a beam that is emitted by the base station to shared initiating equipment and carries target system information, in response to a system information request transmitted by the shared initiating equipment.

In examples of the present disclosure, the target system information refers to the second type of system information. The second type of system information belongs to the necessary information for the UE accessing the network, but the acquisition timing of the second type of system information may be determined according to the actual needs of the UE.

Figure 2A:
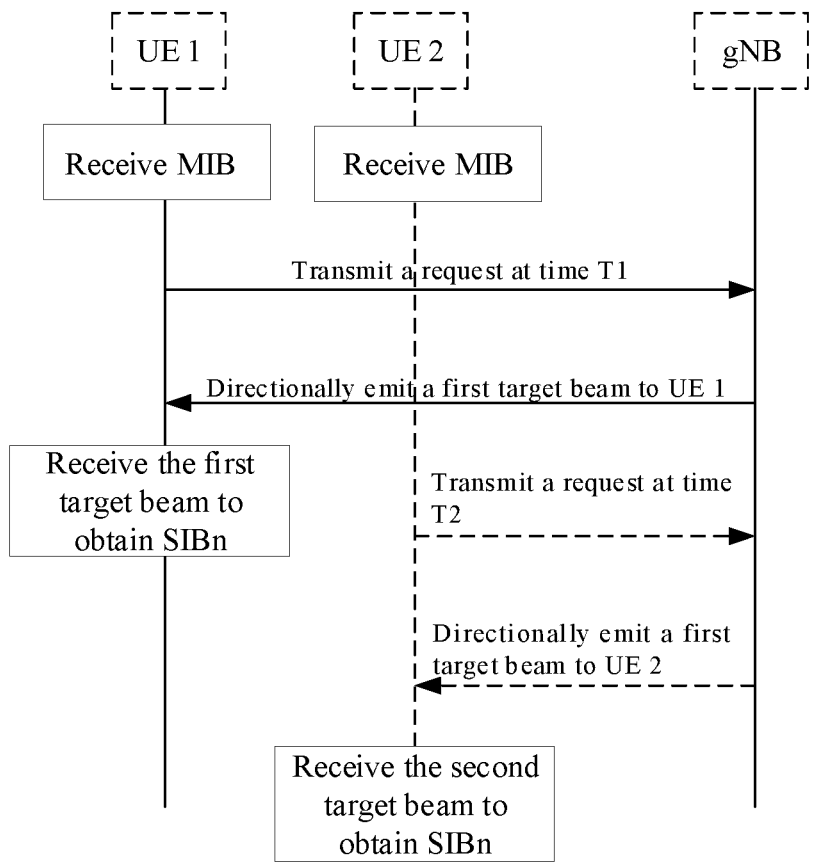
FIG. 2A shows a schematic diagram of obtaining system information according to the related art.

In the related art, the UE always performs an acquisition operation when the target system information is actually needed. FIG. 2A shows a schematic diagram of obtaining system information according to the related art. Assume that there are two pieces of UE, UE 1 and UE 2, and the target system information is a system information block (SIBn). As shown in FIG. 2A, after UE 1 and UE 2 both receive the first type of system information, such as, a master information block (MIB), if UE 1 needs SIBn at time T1, UE 1 transmits a request to the base station at time T1 and simultaneously starts monitoring a target beam to wait for obtaining the SIBn; where in the 5G network, a broadcast signal is transmitted to the UE by a high-frequency beam within a particular frequency band. The target system information in the present disclosure belongs to one type of the broadcast signal, and based on this, in examples of the present disclosure, the high-frequency beam within a particular frequency band and carrying the target system information is referred to as the target beam.

Correspondingly, after receiving the request, the base station emits a first target beam carrying the SIBn to UE 1; and after receiving the first target beam, UE 1 obtains the SIBn.

Similarly, if UE 2 needs SIBn at time T2, UE 2 transmits a request to the base station at time T2; after receiving the request, the base station directionally emits a second target beam carrying SIBn to UE 2; and after UE 2 receives the second target beam, UE 2 obtains the SIBn.

It should be noted that, in the present disclosure, to distinguish the different pieces of UE that initiate the system information requests, the beam emitted by the base station in response to the requests and carrying the target system information is divided into the first target beam and the second target beam. As far as the beams themselves are concerned, the first target beam and the second target beam carry the same system information and occupy the same frequency domain resource.

If the locations of UE 1 and UE 2 are close, that is, the location of UE 2 is within the coverage of the first target beam that is directionally emitted by the base station to UE 1, but because UE 2 does not turn on the function of detecting the target beam, UE 2 cannot receive the first target beam.

In examples of the present disclosure, the UE may turn on the function of detecting the first target beam before the target system information is actually needed, instead of turning on the function of detecting the target beam when actually needed. The specific implementation manner is: the function of detecting the first target beam is turned on under a preset trigger condition. The preset trigger condition may at least include:

a first trigger condition refers to when the UE receives high-level system information;

The system information differs according to the information content, and the corresponding priorities are also different. If the above priorities are expressed as levels, the levels of various types of system information are also different. For example, the level of MIB information is higher than the level of SIB1, and the level of SIB1 is higher than the level of SIBn, where n is a natural number greater than or equal to 2.

In examples of the present disclosure, after receiving the higher-level system information than the target system information SIBn, the UE may start detecting the first target beam i.e., the target beam emitted by the base station in response to the system information request transmitted by other UE.

a second trigger condition refers to when the UE is successfully synchronized.

In examples of the present disclosure, after receiving a downlink synchronization signal and performing synchronization, a physical layer of the UE may start detecting the first target beam that carries the target system information.

At step 12, before a preset state, the first target beam is detected.

In the present disclosure, the preset state refers to a state in which the current UE actually needs the target system information, for example, the SIBn needs to be obtained when preparing to access the network. Assume that the current UE is UE 2 in FIG. 2A, the preset state may correspond to a state in which UE 2 prepares to transmit the request at time T2 in FIG. 2A.

In the present disclosure, after the function of detecting the target beam is turned on, the UE may continuously detect whether there is a shared target beam i.e., the first target beam triggered by other UE, until the preset state in which the target system information is actually needed.

At step 13, if the first target beam is received before the preset state, the target system information is obtained according to the first target beam.

Figure 2B:
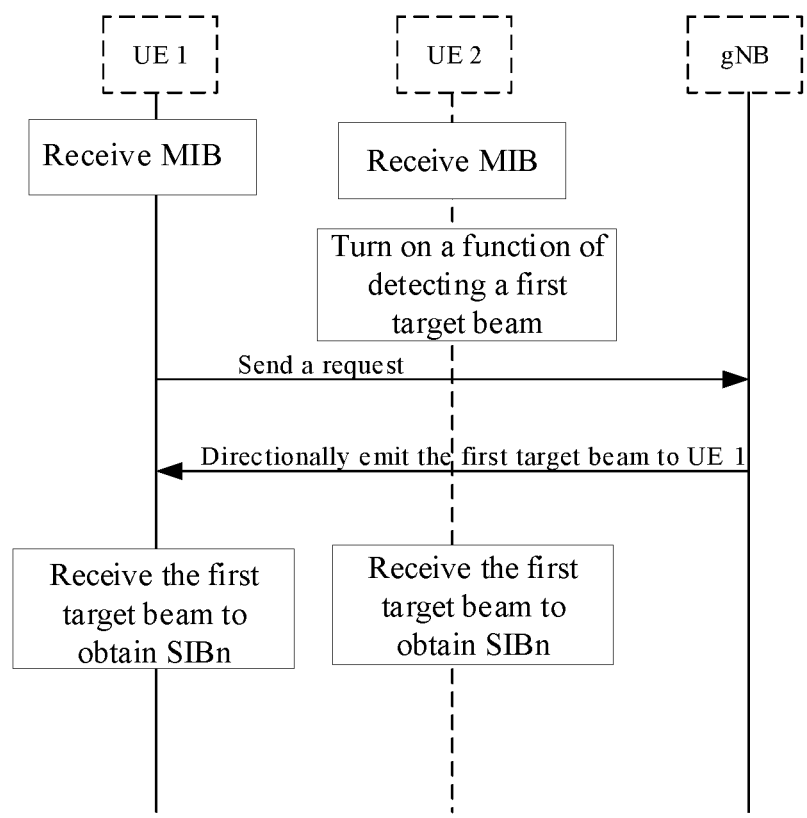
FIG. 2B is a schematic diagram of obtaining system information according to an example of the present disclosure.

FIG. 2B is a schematic diagram of obtaining system information according to an example. If UE 2 starts detecting the first target beam under a preset trigger condition, the base station directionally emits the first target beam to UE 1 in response to the request transmitted by UE 1, and UE 2 is just within the coverage of the first target beam, UE 2 may receive the first target beam, and then obtain the target system information SIBn, so as to share the target system information SIBn with UE 1.

If the UE obtains the target system information before the actual needs, the receiving latency of the target system information is 0 with respect to the actual demand moment. In the related art, the UE waits to receive the target system information after transmitting the request, so there is a receiving latency. Therefore, with respect to the related art, the method of obtaining system information provided by the present disclosure effectively shortens the acquisition latency of the target system information. On the other hand, in the present disclosure, the base station performs one-time target beam scanning in a way that at least two pieces of UE may obtain the target system information, which saves the number of times in which the base station initiates the target beam scanning, effectively saves air interface resources and improves the utilization of air interface resources with respect to the related art.

Figure 3:
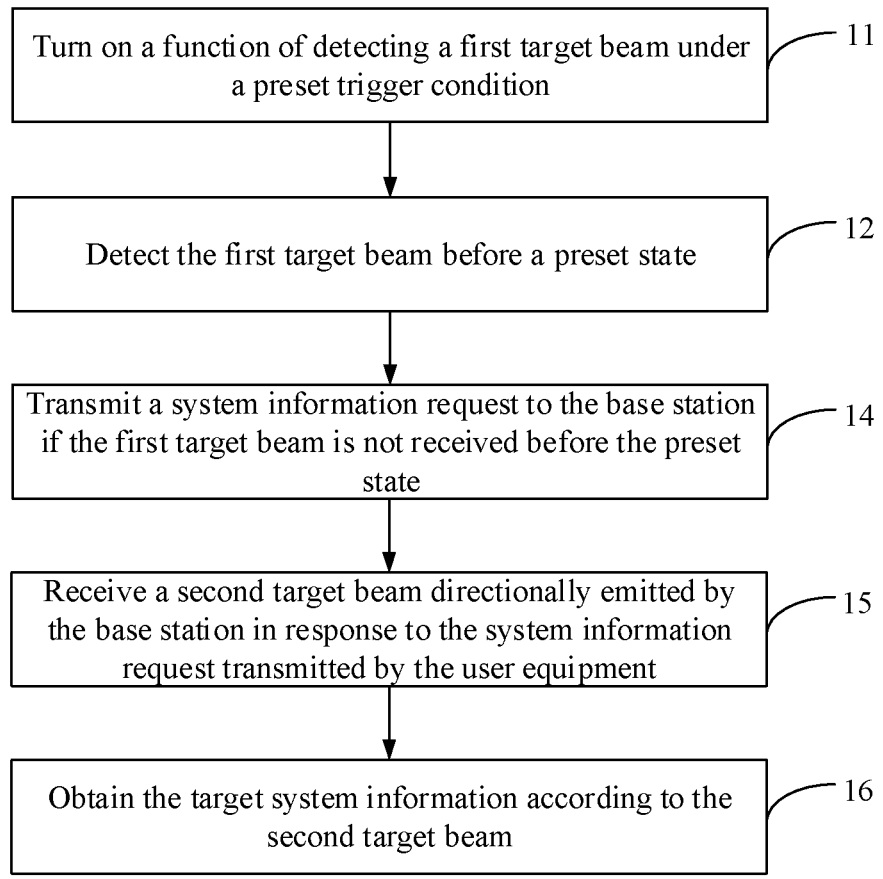
FIG. 3 is a flowchart of another method of obtaining system information according to an example.

FIG. 3 is a flowchart of another method of obtaining system information according to an example. The method may further include:

At step 14, if the first target beam is not received before the preset state, a system information request is transmitted to the base station.

In examples of the present disclosure, if the UE does not receive the first target beam that may be shared until the target system information is actually needed, that is, the target system information has not been obtained yet. At this time, according to the related art, a system information request for obtaining the target system information from the base station may be transmitted to the base station. The system information request may be a separate request message or random access request information. For the latter, after receiving the random access request information, the base station first transmits the target system information to the UE.

At step 15, a second target beam that is directionally emitted by the base station in response to the system information request transmitted by the UE is received.

In the present disclosure, if the current UE does not receive the shared beam, such as the first target beam, before the time T2 as shown in FIG. 2A, the current UE may transmit a system information request to the base station for obtaining target system information according to the related art. As shown in FIG. 2A, UE 2 transmits the request to the base station at time T2.

At step 16, the target system information is obtained according to the second target beam.

UE 2 is still taken as an example. Correspondingly, after receiving the request transmitted by UE 2, the base station directionally emits the second target beam to UE 2. After receiving the second target beam directionally emitted by the base station, UE 2 demodulates the target system information from the second target beam.

In examples of the present disclosure, if the target system information has not been shared until the target system information is actually needed, the UE may still obtain the target system information according to the related art to ensure the reliability of the network connection of the UE.

Figure 4:
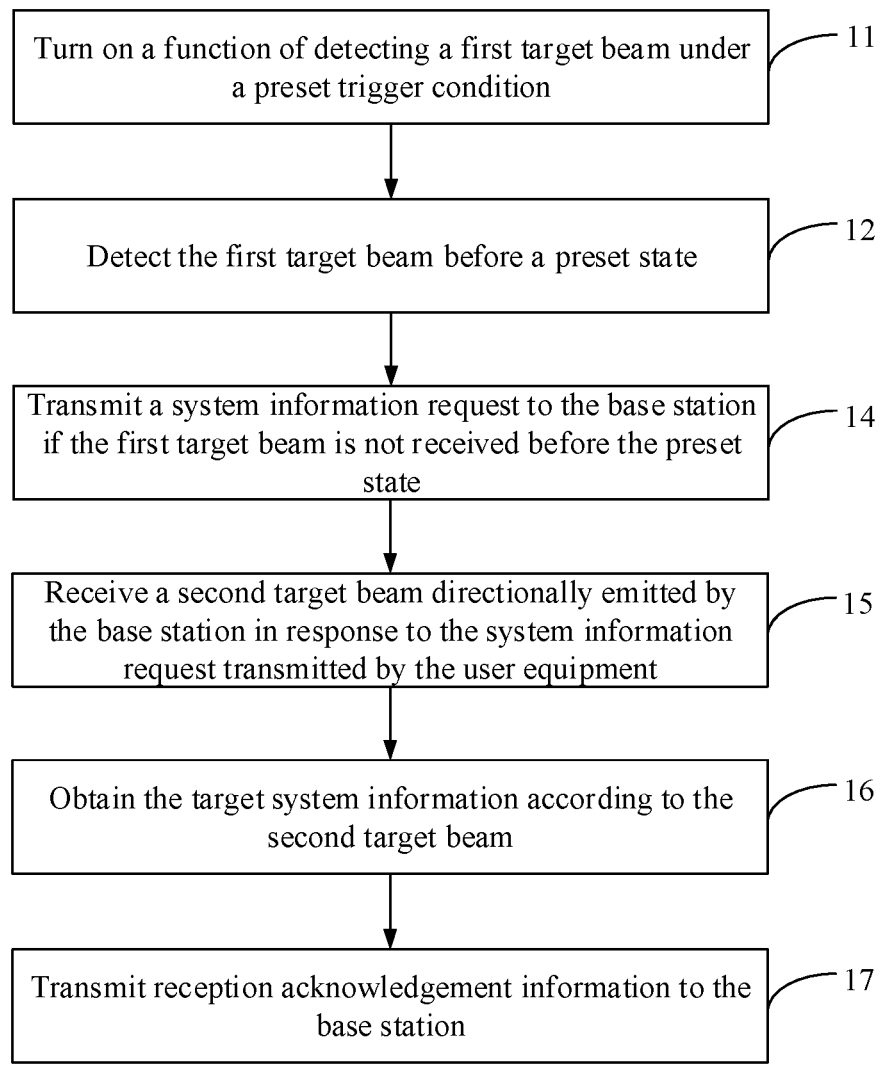
FIG. 4 is a flowchart of another method of obtaining system information according to an example.

FIG. 4 is a flowchart of another method of obtaining system information according to an example. On the basis of the example shown in FIG. 3, after the step 16, the method may further include:

At step 17, reception acknowledgement information is transmitted to the base station.

In examples of the present disclosure, when UE 2 receives the target system information after transmitting the request, UE 2 may transmit the reception acknowledgement information to the base station, so that the base station stops keeping on emitting the second target beam to UE 2 according to the reception acknowledgement information, thereby saving power consumption, saving air interface broadcasting resources and improving the utilization of air interface resources.

Correspondingly, the present disclosure provides a method of transmitting system information, which may be applied to a base station in a 5G network i.e., an emitting end of a high-frequency beam.

Figure 5:
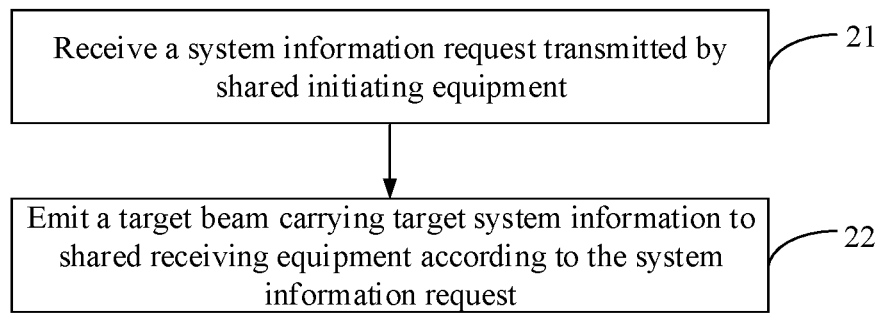
FIG. 5 is a flowchart of a method of transmitting system information according to an example.

FIG. 5 is a flowchart of a method of transmitting system information according to an example. The method may include:

At step 21, a system information request transmitted by shared initiating equipment is received.

In the present disclosure, the shared initiating equipment may be one or more pieces of UE. A target beam emitted by the base station in response to the system information request transmitted by one piece of the use equipment may be received by other UE, thereby obtaining the target system information carried in the target beam together. Therefore, one or more pieces of UE that initiate the system information request are referred to as the shared initiating equipment.

In the present disclosure, the above system information request may be a separate message or an associated message for obtaining the target system information. The foregoing association message is, for example, random access request information. When the base station receives the associated message transmitted by the UE, the base station is triggered to emit the target beam, so as to transmit the target system information to the UE through the target beam.

Figure 6:
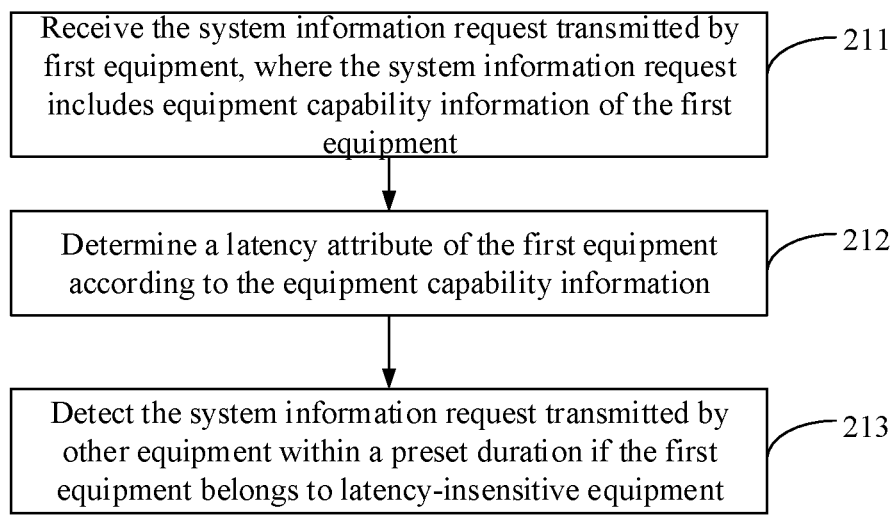
FIG. 6 is a flowchart of another method of transmitting the system information according to an example.

For a case where the base station receives the system information requests transmitted by at least two pieces of shared initiating equipment, FIG. 6 is a flowchart of another method of transmitting the system information according to an example. The foregoing step 21 may include:

At step 211, the system information request transmitted by first equipment is received, where the system information request includes equipment capability information of the first equipment.

In examples of the present disclosure, the first equipment is first shared initiating equipment that transmits the system information request received by the base station within a preset duration. For example, the base station determines the first shared initiating equipment, such as UE 1, within a 60 ms duration from 8:00.

In the present disclosure, the system information request may include equipment capability information, such as latency information supported by the equipment, in addition to the request information content.

At step 212, a latency attribute of the first equipment is determined according to the equipment capability information.

The service types of the 5G network include at least the following three types: URLLC (Ultra Reliable Low Latency Communication) service; mMTC (massive Machine Type Communication) service; and eMBB (enhanced Mobile Broad Band) services. Different data service types have different latency requirements. For example, the URLLC service is applied in fields such as Internet of Vehicles that require low latency. URLLC service requires high timeliness and thus the service needs to be timely created. Accordingly, based on the service data type that the UE mainly transmits and receives, UE can be classified into: URLLC equipment, mMTC equipment, eMBB equipment, and the like.

The base station determines the latency attribute of the equipment according to the equipment capability information of the UE. For example, the equipment is simply divided into latency-sensitive equipment or latency-insensitive equipment. For example, URLLC equipment is latency-sensitive equipment; and mMTC equipment and eMBB equipment are latency-insensitive equipment.

At step 213, if the first equipment belongs to latency-insensitive equipment, the system information request transmitted by other equipment is detected within a preset duration.

In another example of the present disclosure, the base station may preset a latency priority list, where the latency priority list includes: a correspondence between equipment type information and a latency priority. For example, URLLC equipment has the highest latency priority, such as the first level. Exemplarily, the above latency priority list is shown in Table 1:

TABLE 1

| Equipment type | Latency priority |
|---|---|
| URLLC | First |
| mMTC | Second |
| eMBB | Third |

In the present disclosure, the preset duration may be determined according to a latency priority of the latency-insensitive equipment. As shown in the above Table 1, if the eMBB equipment and the mMTC equipment both belong to latency-insensitive equipment, the eMBB equipment has a lower latency requirement than the mMTC equipment. Therefore, if the first equipment is eMBB equipment, the waiting time may be longer. Assume that the preset duration of the mMTC equipment is 30 ms, the preset duration of the eMBB equipment may be longer than 30 ms, such as 60 ms.

UE 1 is still taken as an example. If UE 1 is a latency-insensitive equipment, for example, UE 1 is eMBB equipment. The base station may delay the emission of the target beam, and wait for a preset duration, for example, 60 ms. The base station detects whether there is other equipment transmitting the same system information request within 60 ms.

In examples of the present disclosure, the other shared initiating equipment may be latency-insensitive equipment or latency-sensitive equipment.

At step 22, a target beam carrying target system information is emitted to shared receiving equipment according to the system information request.

In the present disclosure, after receiving the system information request, the base station emits the target beam based on an initiating location of the system information request. As above, the target beam is a high-frequency beam carrying the target system information and emitting by the base station with a designated frequency, such as 6 GHz.

The above shared receiving equipment refers to all UE that may receive the target beam during the period of the target beam scanning emission.

Figure 7A:
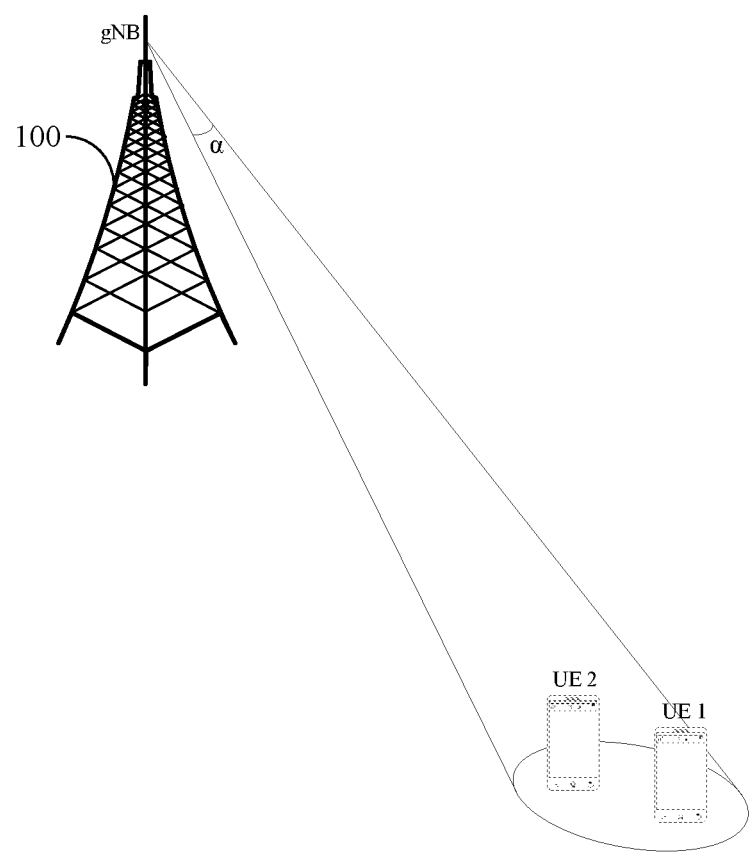
FIG. 7A is a schematic diagram of a scenario of transmitting system information according to an example of the present disclosure.

FIG. 7A is a schematic diagram of a scenario of transmitting system information according to an example. After receiving the system information request transmitted by UE 1, if the location of UE 1 is unchanged, the base station 100 may determine a location of UE 1 according to the system information request transmitted by UE 1. And the base station 100 may directionally emit the target beam to UE 1 according to the location of UE 1, where the size of an emission angle α of the target beam is preset. If there is other UE such as UE 2 that has turned on the function to receive the target beam within a beam coverage corresponding to the location at which the target beam reaches UE 1, UE 2 may also receive the target beam, and then obtain the target system information according to the target beam. In this example, UE 1 and UE 2 are the shared receiving equipment.

Figure 7B:
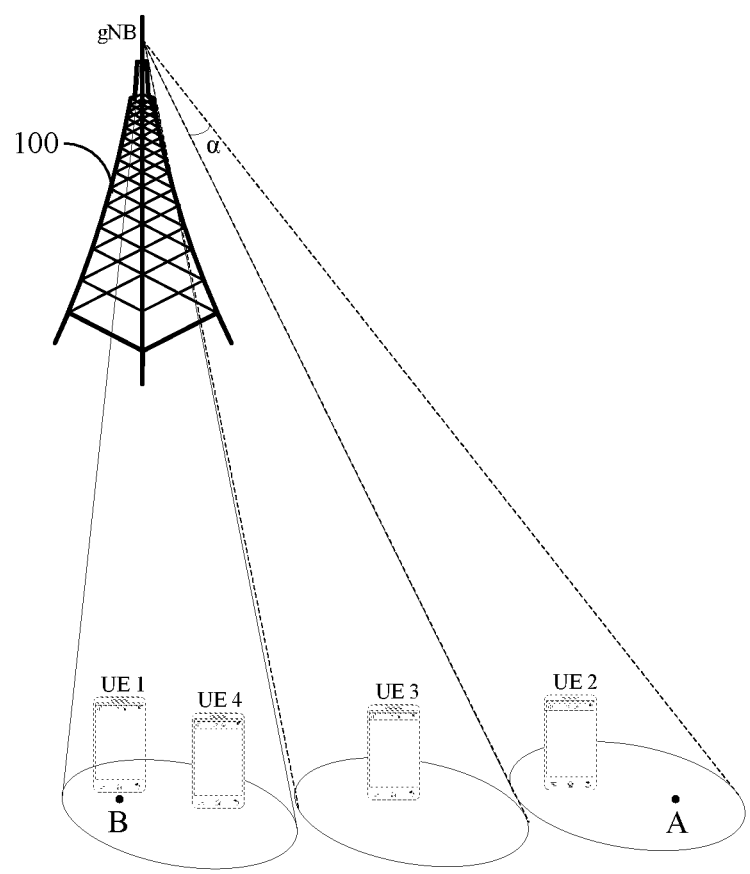
FIG. 7B is a schematic diagram of another scenario of transmitting system information according to an example of the present disclosure.

FIG. 7B is a schematic diagram of another scenario of transmitting system information according to an example. After receiving the system information request transmitted by UE 1, if the location of UE 1 is changed, for example, UE 1 is moving from the location A to the location B, the base station 100 may determine a request initiating location of UE 1, such as the location A, according to the system information request transmitted by UE 1. The base station 100 emits the target beam to UE 1 in a scanning manner starting from the request initiating location A until the target beam is scanned to a location, such as the location B, where UE 1 is currently located. During the beam scanning process, if there is other UE, such as, UE 2, UE 3 and UE 4, that has turned on the function to receive the target beam within the scanning region, the three pieces of UE may also receive the target beam, and then obtain the target system information according to the target beam. In this example, UE 1, UE 2, UE 3, and UE 4 are the shared receiving equipment.

Figure 8:
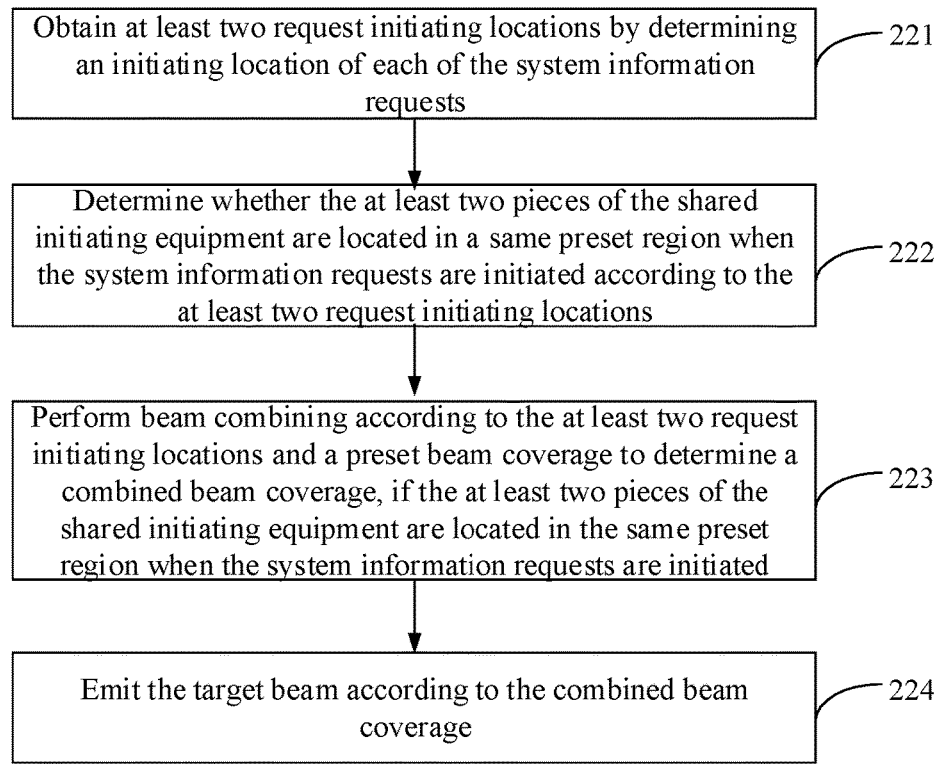
FIG. 8 is a flowchart of another method of transmitting system information according to an example.

In another example of the present disclosure, if the base station receives the system information requests transmitted by at least two pieces of shared initiating equipment, referring to FIG. 8, it is a flowchart of another method of transmitting system information according to an example. The step 22 may include:

At step 221, an initiating location of each of the system information requests is determined to obtain at least two request initiating locations.

In the present disclosure, if the base station receives the same system information requests transmitted by at least two pieces of shared initiating equipment simultaneously or within a preset duration. Taking two pieces of shared initiating equipment UE 01 and UE 02 as an example, in the present disclosure, the system information request may include: a location of the equipment. After receiving the system information requests transmitted by UE 01 and UE 02, the base station may determine the initiating location of each of the system information requests, i.e., the locations when UE 01 and UE 02 transmit the system information request, which are assumed to be A1 and A2.

At step 222, it is determined whether the at least two pieces of the shared initiating equipment are located in a same preset region when the system information requests are initiated according to the at least two request initiating locations.

As above, the base station may determine whether the distance between A1 and A2 is less than a preset threshold according to the locations of A1 and A2. If the distance between A1 and A2 is less than the preset threshold, it may be determined that UE 01 and UE 02 belong to the neighboring equipment when the system information requests are initiated.

Certainly, if the number of received system information requests is greater than or equal to 3, it may be determined whether the multiple shared initiating equipment belong to neighboring equipment in the same region when the system information requests are initiated according to the related knowledge. For example, an area of a polygon formed by mapping locations of the multiple equipment in a same plane is determined. If the area of the polygon is less than a preset threshold, it is determined that the multiple shared initiating equipment belong to neighboring equipment in the same region.

At step 223, if the at least two pieces of the shared initiating equipment are located in the same preset region when the system information requests are initiated, beam combining is performed according to the at least two request initiating locations and a preset beam coverage to determine a combined beam coverage.

In the present disclosure, the preset beam coverage may be a high-frequency beam within a particular frequency band and having a fixed emission angle preset by the base station.

Figure 9A:
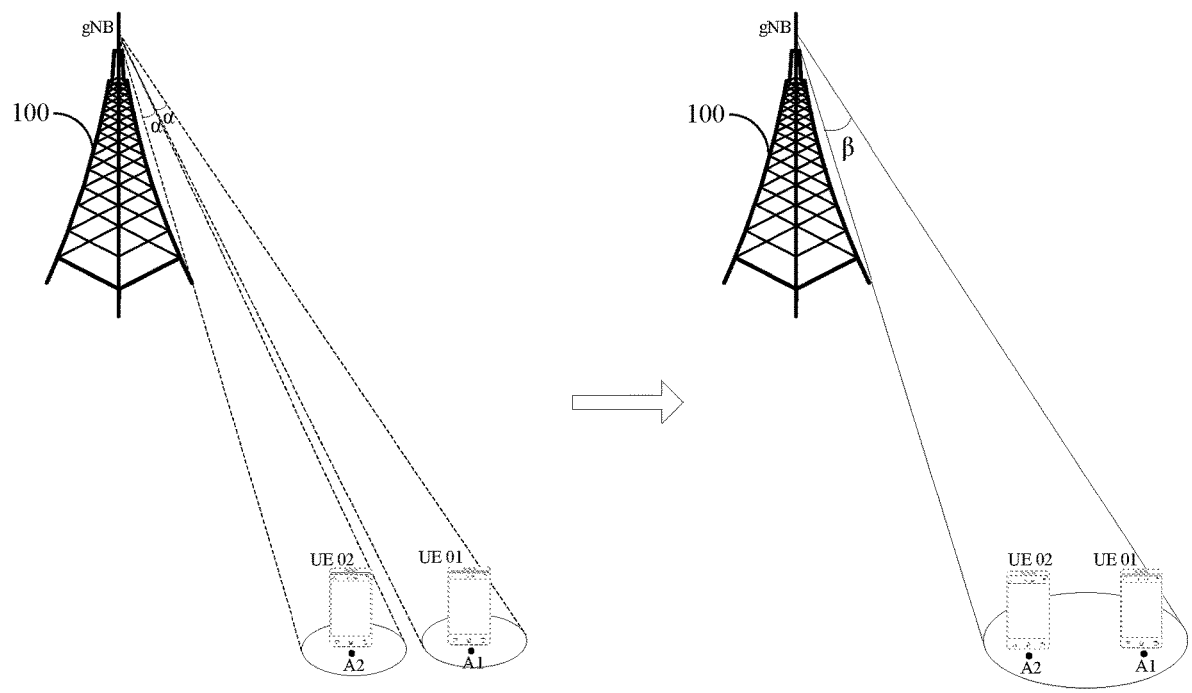
FIG. 9A is a schematic diagram of another scenario of transmitting system information according to an example of the present disclosure.

FIG. 9A is another schematic diagram of transmitting system information according to an example. After receiving the system information requests transmitted by UE 01 and UE 02, the base station determines that the request initiating locations are respectively A1 and A2. The base station respectively emits the target beams with the preset beam coverage, i.e., two preset beams with an emission angle α, to UE 01 and UE 02 according to related technologies. In the present disclosure, when it is determined that A1 and A2 are within the same preset region, the emission angle of the target beam may be re-determined according to the locations of A1 and A2, and beam combining is performed according to the preset beam emission angle α. The combined beam emission angle is β, where α<β<2α.

At step 224, the target beam is emitted according to the combined beam coverage.

In the present disclosure, according to the receiving time sequence of the at least two system information requests, the step 224 may include the following two implementation manners.

In the first manner, if the at least two system information requests are received by the base station at the same time, the base station emits the target beam according to the combined beam coverage after receiving the requests.

In the second manner, if the at least two system information requests are successively received by the base station within the preset duration, the step 224 may be specifically:

when the preset duration is expired, the target beam is emitted according to the preset beam coverage.

Figure 9B:
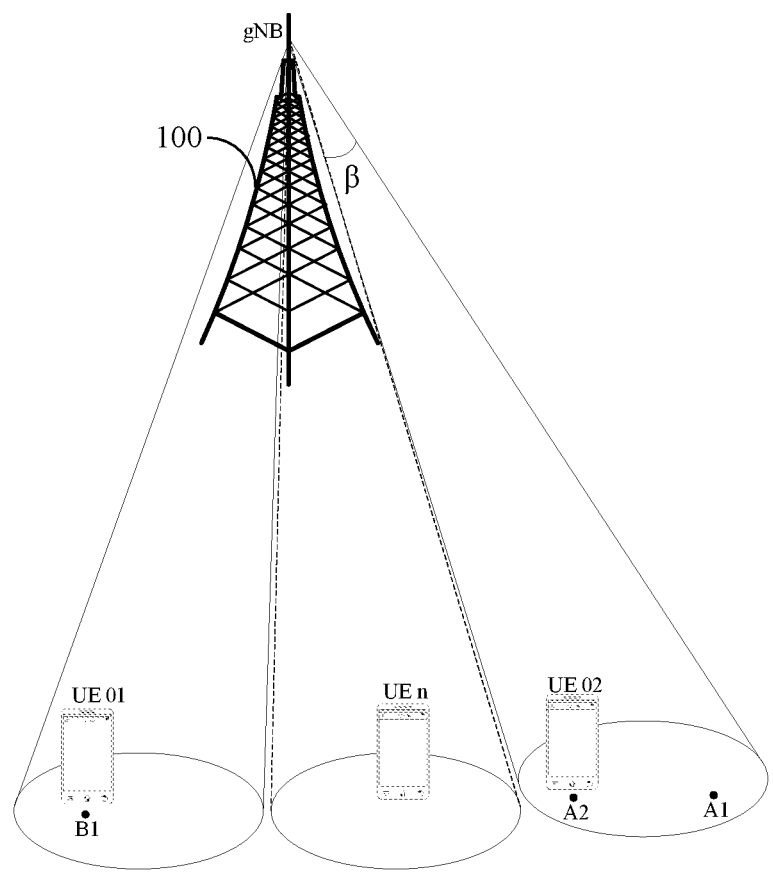
FIG. 9B is a schematic diagram of another scenario of transmitting system information according to an example of the present disclosure.

As shown in FIG. 9A, during the subsequent emission of the target beam, scanning is performed with the target beam having the emission angle according to the combined beam coverage. FIG. 9A shows the case where the location of UE 01 and UE 02 are unchanged. In another example of the present disclosure, any of the shared initiating equipment may quickly move to another location after transmitting the request. As shown in FIG. 9B, if UE 01 quickly moves after transmitting the system information request at the location A1, the base station starts scanning with the target beam of the emission angle β from the locations A1 and A2 until the scanning beam covers the current location B1 of UE 01.

Figure 10:
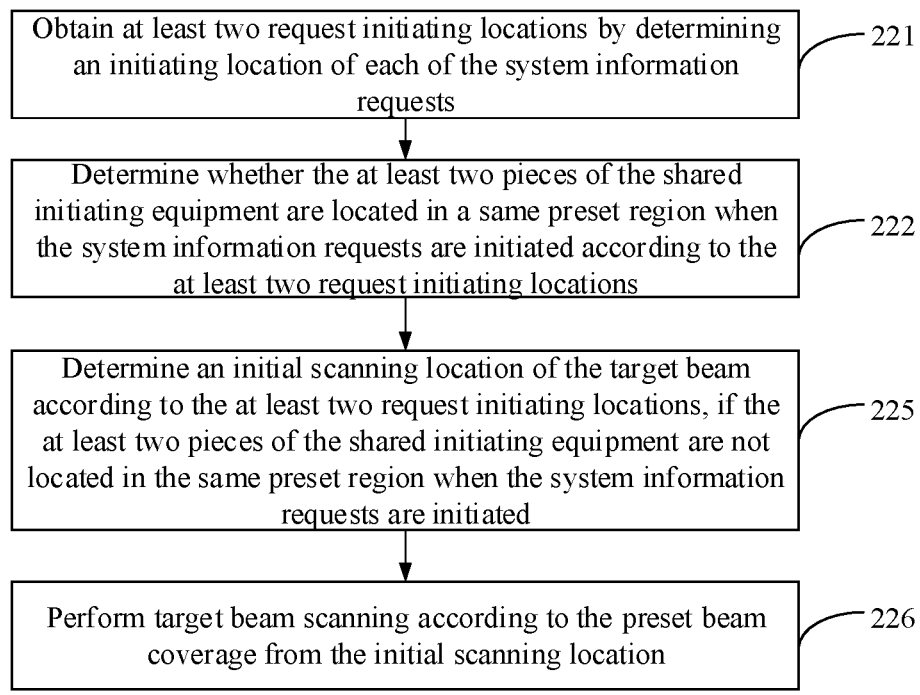
FIG. 10 is a flowchart of another method of transmitting system information according to an example.

In another example of the present disclosure, FIG. 10 is a flowchart of another method of transmitting system information according to an example. The step 22 may further include:

At step 225, if the at least two pieces of the shared initiating equipment are not located in the same preset region when the system information requests are initiated, an initial scanning location of the target beam is determined according to the at least two request initiating locations.

In the present disclosure, the initial scanning location of the target beam may be determined in any of the following manners.

In the first manner, according to the chronological order, a request initiating location of equipment first initiating the request may be determined as the initial scanning location.

In the second manner, a request initiating location of equipment with the highest latency priority is determined as the initial scanning location of the target beam.

In the third manner, the initial scanning location of the target beam is determined by combining a request initiating time sequence of the shared initiating equipment with a latency priority of the shared initiating equipment.

At step 226, target beam scanning is performed according to the preset beam coverage from the initial scanning location.

Figure 11:
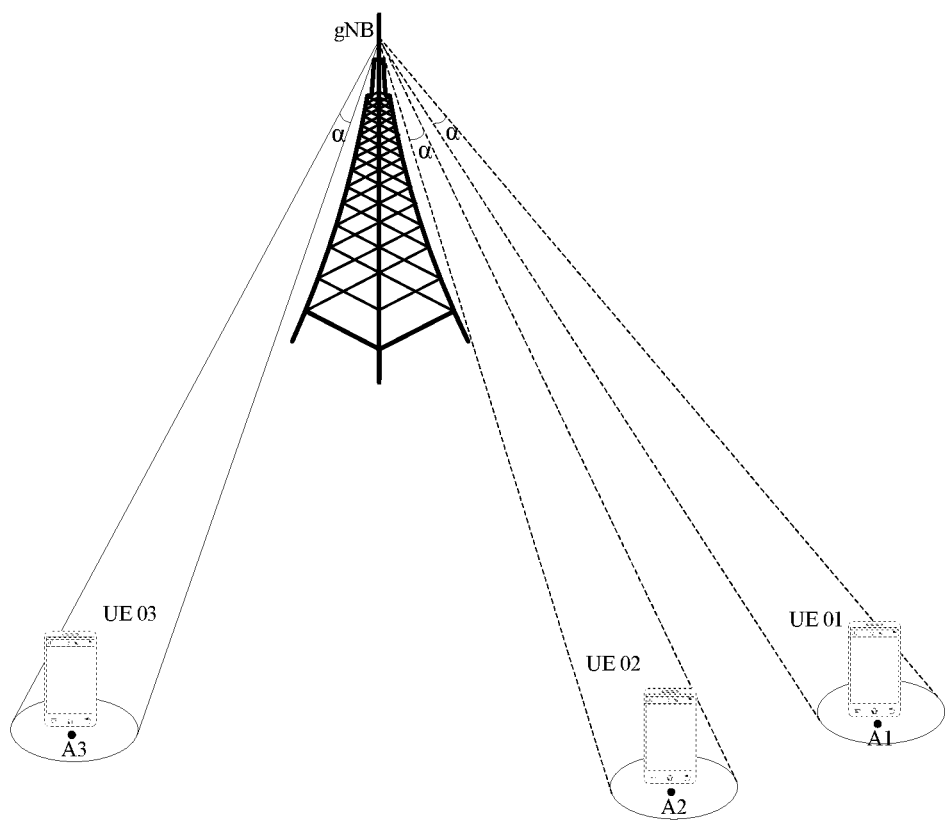
FIG. 11 is a schematic diagram of another scenario of transmitting system information according to an example of the present disclosure.

FIG. 11 is a schematic diagram of another scenario of transmitting system information according to an example. The base station 100 receives, within a preset duration of 60 ms, three requests for obtaining system information, such as three requests for obtaining the system information SIBn. The three requests are respectively transmitted by three pieces of UE, UE 01, UE 02, and UE 03, located in different regions. It is assumed that UE 01 and UE 02 are eMBB equipment and UE 03 is mMTC equipment. Although the above three pieces of equipment belong to latency-insensitive equipment with respect to the preset duration of 60 ms, according to Table 1, the latency priority of UE 03 is slightly higher than that of UE 01 and UE 02. Therefore, the base station may determine the request initiating location of UE 03 as the initial scanning location, and start scanning by using the target beam with the preset beam coverage i.e., the emission angle α from the request initiating location of UE 03.

Figure 12:
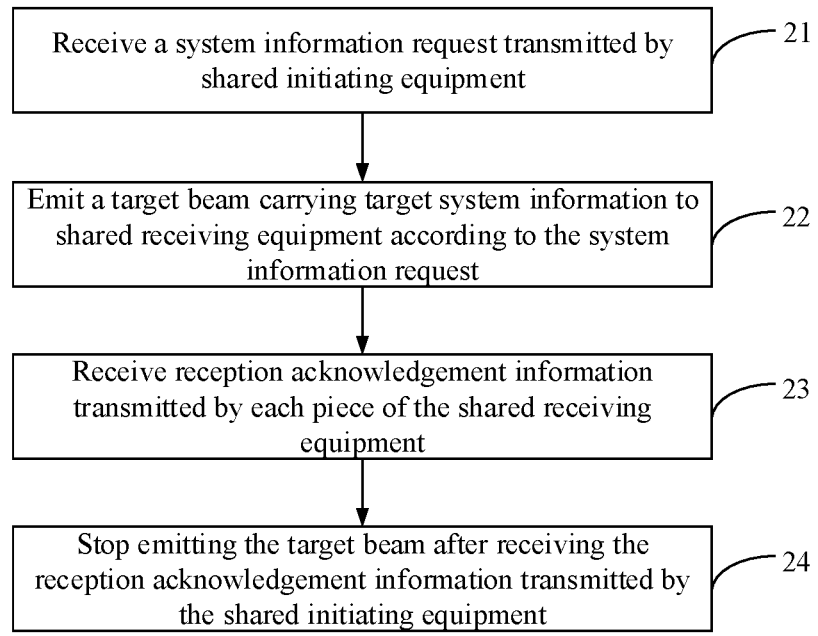
FIG. 12 is a flowchart of another method of transmitting system information according to an example.

FIG. 12 is a flowchart of another method of transmitting system information according to an example. On the basis of the example shown in FIG. 5, the method may further include:

At step 23, reception acknowledgement information transmitted by each piece of the shared receiving equipment is received.

In the present disclosure, the reception acknowledgement information indicates that the UE has obtained the target system information.

As shown in FIG. 7A, the base station 100 may also receive the reception acknowledgement information transmitted by UE 1 and UE 2. Similarly, in FIG. 7B, the base station 100 may receive the reception acknowledgement information transmitted by UE 1-UE 4.

At step 24, after receiving the reception acknowledgement information transmitted by the shared initiating equipment, emitting the target beam is stopped.

In the present disclosure, when the base station determines that the shared initiating equipment has obtained the target system information, emitting the target beam may be stopped to save power consumption. As shown in FIGS. 7A and 7B, after receiving the reception acknowledgement information transmitted by UE 1, the base station may stop emitting the target beam.

Certainly, if the number of the shared initiating equipment is multiple, the base station may stop emitting the target beam after receiving the reception acknowledgement information transmitted by all the shared initiating equipment. As shown in FIG. 11, after determining the reception acknowledgement information transmitted by UE 01, UE 02, and UE 03, the base station may stop emitting the target beam.

For the foregoing method examples, for the sake of brevity, they are all described as a series of combinations of actions, but those skilled in the art should understand that the present disclosure is not limited by the described order of actions, because according to the present disclosure, some steps may be performed in other orders or at the same time.

In addition, those skilled in the art should also understand that the examples described in the specification are optional examples, and the actions and modules involved are not necessarily required by the present disclosure.

Corresponding to examples of the application function implementing method, the present disclosure further provides examples of the application function implementing apparatus and corresponding terminal.

Figure 13:
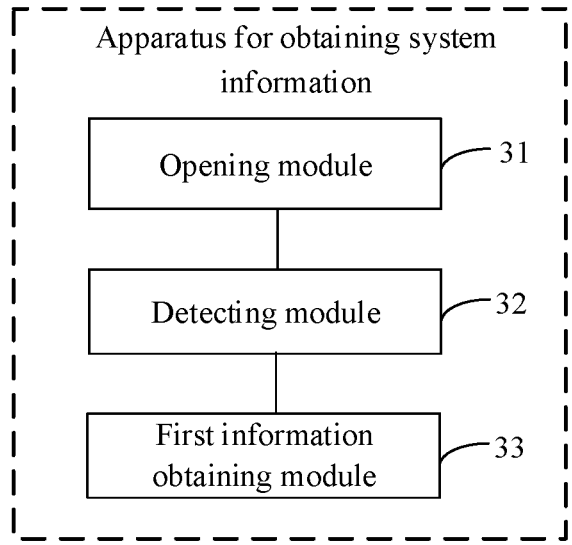
FIG. 13 is a block diagram of an apparatus for obtaining system information according to an example.

FIG. 13 is a block diagram of an apparatus for obtaining system information according to an example. The apparatus may be applied to UE and includes:

an opening module 31, configured to turn on a function of detecting a first target beam under a preset trigger condition, where the first target beam is a beam that carries target system information and is emitted by a base station to shared initiating equipment in response to a system information request transmitted by the shared initiating equipment;

The preset trigger condition includes when receiving high-level system information; or when downlink synchronization is successful.

a detecting module 32, configured to detect the first target beam before a preset state; and a first information obtaining module 33, configured to obtain the target system information according to the first target beam if the first target beam is received before the preset state.

Figure 14:
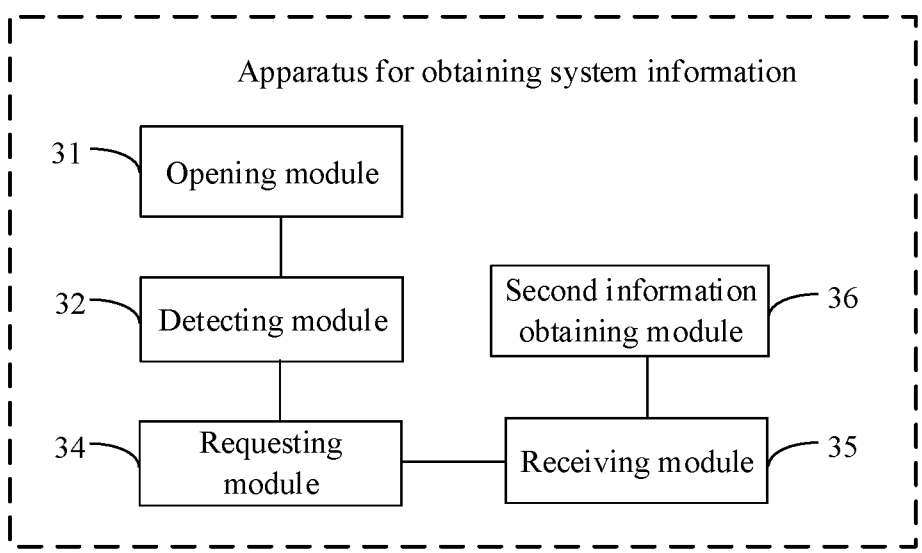
FIG. 14 is a block diagram of another apparatus for obtaining system information according to an example.

FIG. 14 is a block diagram of another apparatus for obtaining system information according to an example. On the basis of examples of the apparatus shown in FIG. 13, the apparatus further includes:

a requesting module 34, configured to transmit a system information request to the base station if the first target beam is not received before the preset state;

a receiving module 35, configured to receive a second target beam directionally emitted by the base station in response to the system information request transmitted by the UE; and a second information obtaining module 36, configured to obtain the target system information according to the second target beam.

Figure 15:
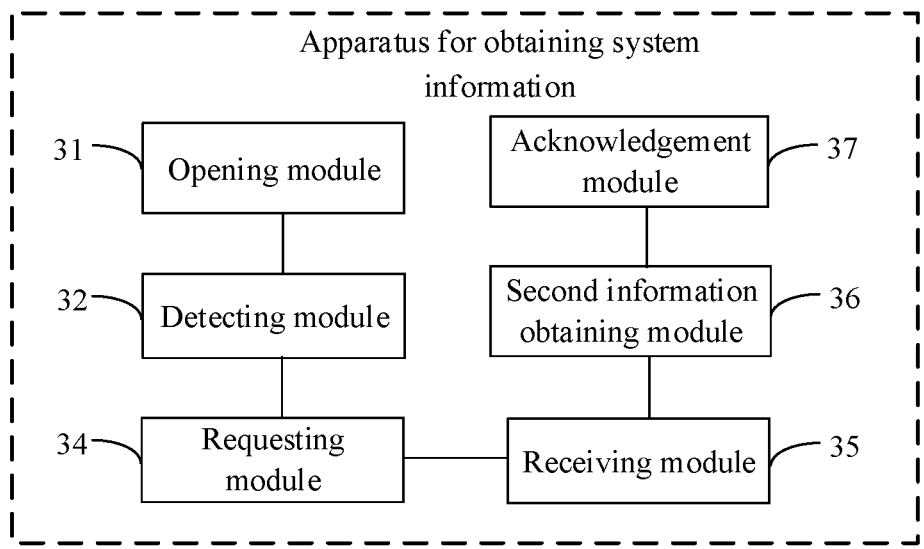
FIG. 15 is a block diagram of another apparatus for obtaining system information according to an example.

FIG. 15 is a block diagram of another apparatus for obtaining system information according to an example. On the basis of examples of the apparatus shown in FIG. 14, the apparatus further includes:

an acknowledgement module 37, configured to transmit reception acknowledgement information to the base station.

Figure 16:
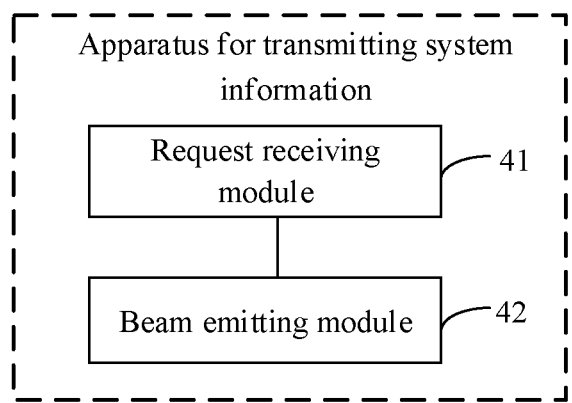
FIG. 16 is a block diagram of an apparatus for transmitting system information according to an example.

Correspondingly, the present disclosure further discloses an apparatus for transmitting system information applied in a base station. FIG. 16 is a block diagram of an apparatus for transmitting system information according to an example. The apparatus may include:

a request receiving module 41, configured to receive a system information request transmitted by shared initiating equipment; and a beam emitting module 42, configured to emit a target beam carrying target system information to shared receiving equipment according to the system information request, where the shared receiving equipment at least includes the shared initiating equipment.

Figure 17:
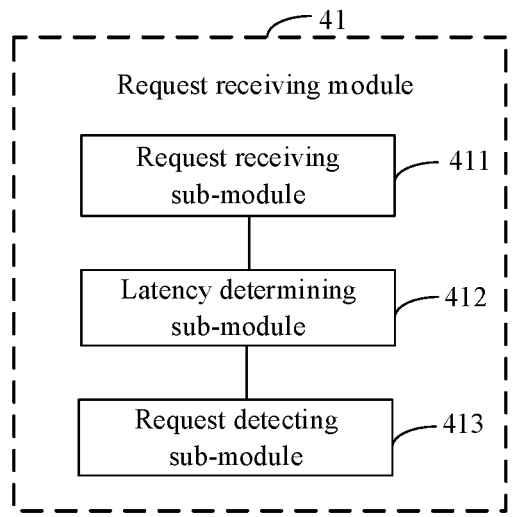
FIG. 17 is a block diagram of another apparatus for transmitting system information according to an example.

FIG. 17 is a block diagram of another apparatus for transmitting system information according to an example. On the basis of examples of the apparatus shown in FIG. 16, the request receiving module 41 may include:

a request receiving sub-module 411, configured to receive the system information request transmitted by first equipment, where the system information request includes equipment capability information of the first equipment;

a latency determining sub-module 412, configured to determine a latency attribute of the first equipment according to the equipment capability information; and a request detecting sub-module 413, configured to detect the system information request transmitted by other equipment within a preset duration if the first equipment belongs to latency-insensitive equipment.

Figure 18:
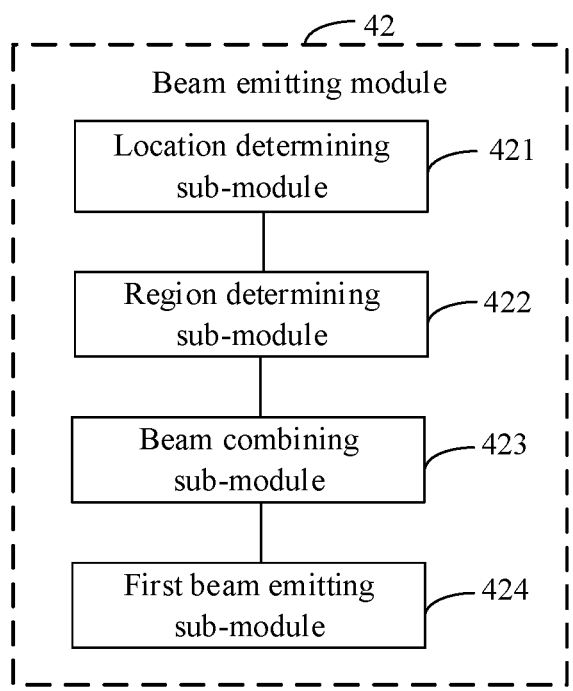
FIG. 18 is a block diagram of another apparatus for transmitting system information according to an example.

FIG. 18 is a block diagram of another apparatus for transmitting system information according to an example. If the base station receives the system information requests transmitted by at least two pieces of the shared initiating equipment, the beam emitting module 42 may include:

a location determining sub-module 421, configured to obtain at least two request initiating locations by determining an initiating location of each of the system information requests;

a region determining sub-module 422, configured to determine whether the at least two pieces of the shared initiating equipment are located in a same preset region when the system information requests are initiated according to the at least two request initiating locations;

a beam combining sub-module 423, configured to perform beam combining according to the at least two request initiating locations and a preset beam coverage to determine a combined beam coverage, if the at least two pieces of the shared initiating equipment are located in the same preset region when the system information requests are initiated; and a first beam emitting sub-module 424, configured to emit the target beam according to the combined beam coverage.

Figure 19:
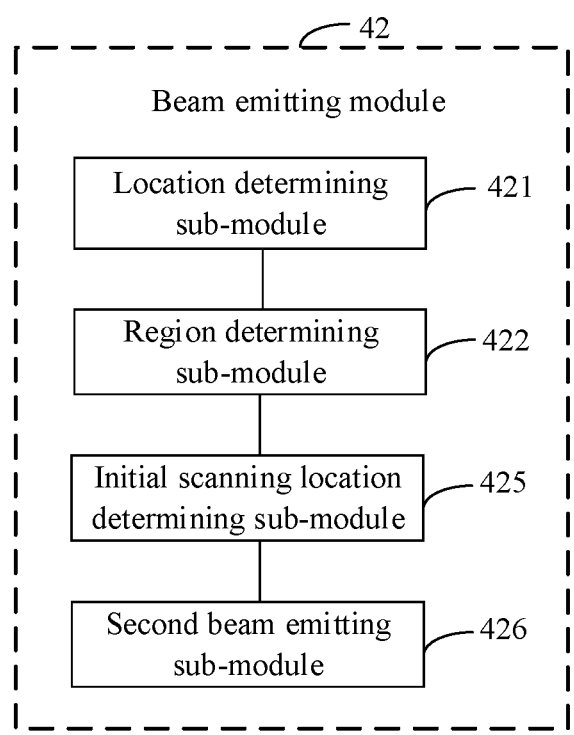
FIG. 19 is a block diagram of another apparatus for transmitting system information according to an example.

FIG. 19 is a block diagram of another apparatus for transmitting system information according to an example. On the basis of examples of the apparatus shown in FIG. 18, the beam emitting module 42 may further include:

an initial scanning location determining sub-module 425, configured to determine an initial scanning location of the target beam according to the at least two request initiating locations if the at least two pieces of the shared initiating equipment are not located in the same preset region when the system information requests are initiated; and a second beam emitting sub-module 426, configured to perform target beam scanning according to the preset beam coverage from the initial scanning location.

Figure 20:
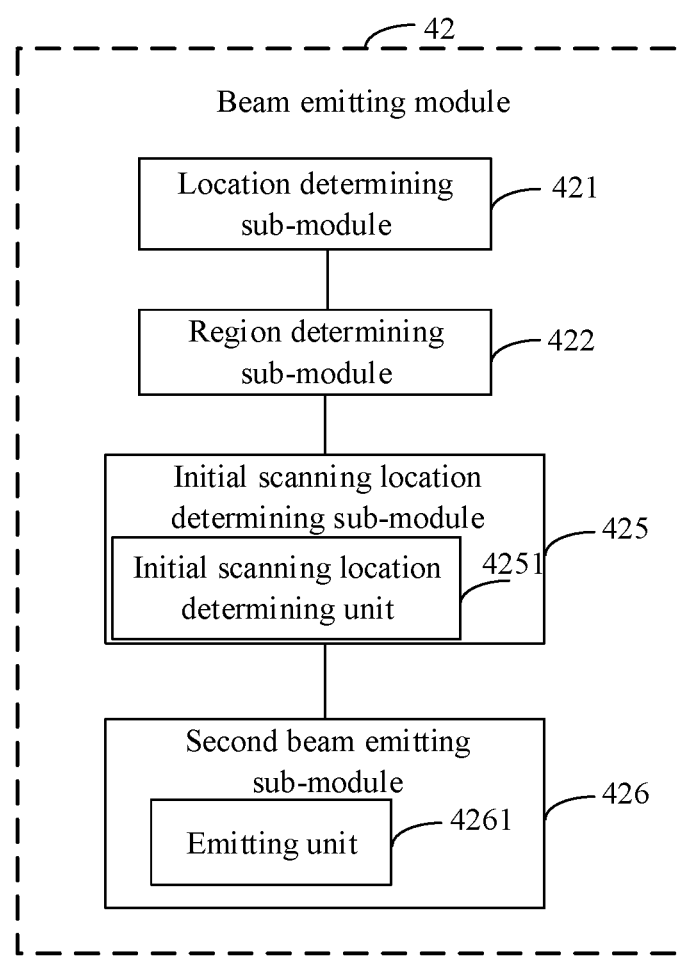
FIG. 20 is a block diagram of another apparatus for transmitting system information according to an example.

FIG. 20 is a block diagram of another apparatus for transmitting system information according to an example. On the basis of examples of the apparatus shown in FIG. 19, if at least two system information requests are successively received by the base station within a preset duration, the initial scanning location determining sub-module 425 may include:

an initial scanning location determining unit 4251, configured to determine the initial scanning location of the target beam according to a receiving time sequence of each of the system information requests and/or a latency attribute of each piece of the shared initiating equipment;

the second beam emitting sub-module 426 may include:

an emitting unit 4261, configured to perform the target beam scanning according to the preset beam coverage from the initial scanning location when the preset duration is expired.

Figure 21:
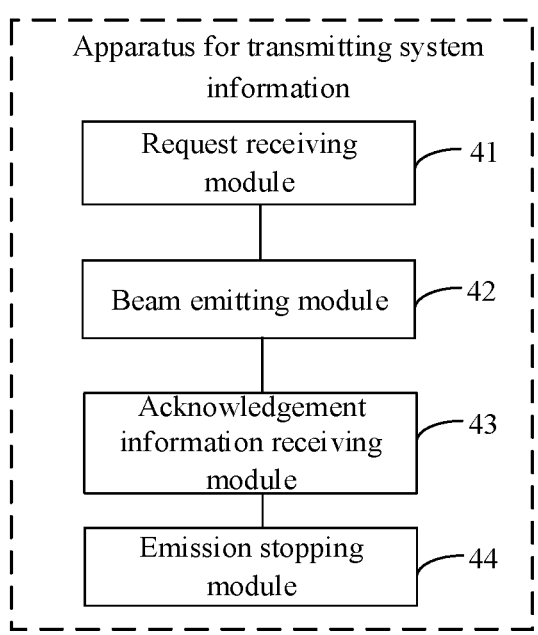
FIG. 21 is a block diagram of another apparatus for transmitting system information according to an example.

FIG. 21 is a block diagram of an apparatus for transmitting system information according to an example. On the basis of examples of the apparatus shown in FIG. 16, the apparatus may include:

an acknowledgement information receiving module 43, configured to receive reception acknowledgement information transmitted by each piece of the shared receiving equipment; and an emission stopping module 44, configured to stop emitting the target beam after receiving the reception acknowledgement information transmitted by the shared initiating equipment.

For the apparatus examples, since it substantially corresponds to the method examples, the relevant parts may refer to the part of the method examples. The apparatus examples described above is merely illustrative, where the units described as the separate component may or may not be physically separate, and the component shown as a unit may or may not be a physical unit, i.e., may be located in one place or may be distributed to a plurality of network elements. A part or all of the modules may be selected according to the actual needs to achieve the purpose of the solution of the present disclosure. Those skilled in the art may understand and practice it without making creative work.

Correspondingly, in one aspect, examples of the present disclosure provide an apparatus for obtaining system information, which is applied in UE and includes a processor and a memory to store instructions executable by the processor; where the processor is configured to:

turn on a function of detecting a first target beam under a preset trigger condition, where the first target beam is a beam that carries target system information and is emitted by a base station to shared initiating equipment in response to a system information request transmitted by the shared initiating equipment;

detect the first target beam before a preset state; and obtain the target system information according to the first target beam if the first target beam is received before the preset state.

In another aspect, examples of the present disclosure provide an apparatus for transmitting system information, which is applied in a base station and includes a processor and a memory to store instructions executable by the processor; where the processor is configured to:

receive a system information request transmitted by shared initiating equipment; and emit a target beam carrying target system information to shared receiving equipment according to the system information request, where the shared receiving equipment at least includes the shared initiating equipment.

Figure 22:
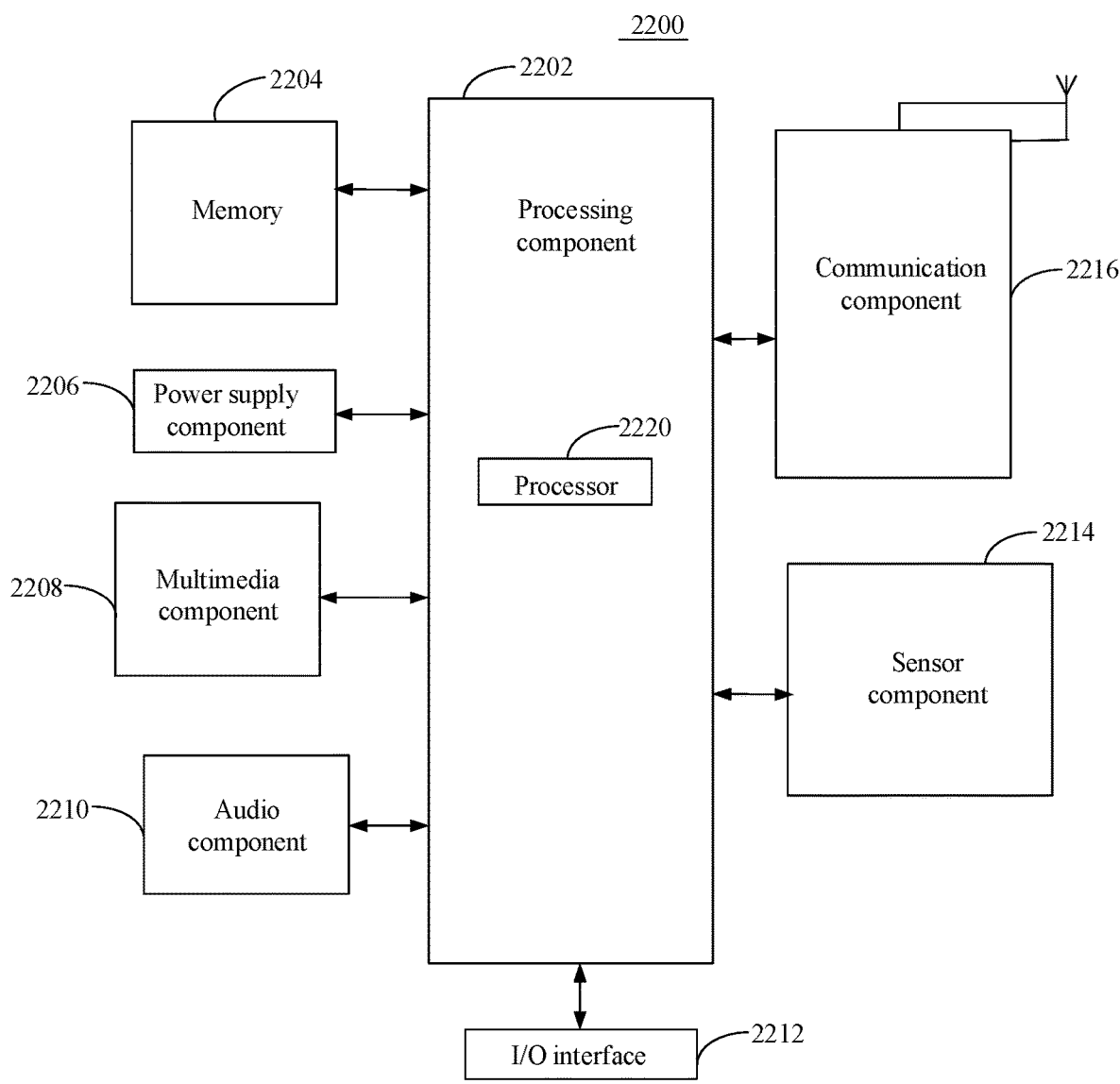
FIG. 22 is a structural diagram of an apparatus for obtaining system information according to an example of the present disclosure.

FIG. 22 is a structural diagram of an apparatus 2200 for obtaining system information according to an example. For example, the apparatus 2200 may be a terminal, and may specifically be a mobile phone, a computer, a digital broadcasting terminal, a message receiving and transmitting device, a game console, a tablet device, a medical device, a fitness device, a personal digital assistant, an internet of things device, a wearable device such as a smart watch, a smart glass, a smart band, a smart running shoe, and so on.

Referring to FIG. 22, the apparatus 2200 may include one or more of the following components: a processing component 2202, a memory 2204, a power supply component 2206, a multimedia component 2208, an audio component 2210, an input/output (I/O) interface 2212, a sensor component 2214, and a communication component 2216.

The processing component 2202 generally controls overall operations of the apparatus 2200, such as operations associated with display, phone calls, data communications, camera operations, and recording operations. The processing component 2202 may include one or more processors 2220 to execute instructions to complete all or part of the steps of the above methods. In addition, the processing component 2202 may include one or more modules which facilitate the interaction between the processing component 2202 and other components. For example, the processing component 2202 may include a multimedia module to facilitate the interaction between the multimedia component 2208 and the processing component 2202.

The memory 2204 is to store various types of data to support the operation of the apparatus 2200. Examples of such data include instructions for any application or method operated on the apparatus 2200, contact data, phonebook data, messages, pictures, videos, and so on. The memory 2204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 2206 provides power to different components of the apparatus 2200. The power supply component 2206 may include a power management system, one or more power supplies, and other components associated with generating, managing, and distributing power for the apparatus 2200.

The multimedia component 2208 includes a screen providing an output interface between the apparatus 2200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2208 may include a front camera and/or a rear camera. The front camera and/or rear camera may receive external multimedia data when the apparatus 2200 is in an operating mode, such as a photographing mode or a video mode. Each of the front camera and the rear camera may be a fixed optical lens system or have focal length and optical zooming capability.

The audio component 2210 is to output and/or input an audio signal. For example, the audio component 2210 includes a microphone (MIC). When the apparatus 2200 is in an operating mode, such as a call mode, a recording mode, and a voice recognition mode, the MIC is to receive an external audio signal. The received audio signal may be further stored in the memory 2204 or sent via the communication component 2216. In some examples, the audio component 2210 further includes a speaker to output an audio signal.

The I/O interface 2212 may provide an interface between the processing component 2202 and peripheral interface modules. The above peripheral interface modules may include a keyboard, a click wheel, buttons and so on. These buttons may include, but are not limited to, a home button, a volume button, a starting button and a locking button.

The sensor component 2214 includes one or more sensors to provide status assessments of various aspects for the apparatus 2200. For example, the sensor component 2214 may detect the on/off status of the apparatus 2200, and relative positioning of component, for example, the component is a display and a keypad of the apparatus 2200. The sensor component 2214 may also detect a change in position of the apparatus 2200 or a component of the apparatus 2200, a presence or absence of the contact between a user and the apparatus 2200, an orientation or an acceleration/deceleration of the apparatus 2200, and a change in temperature of the apparatus 2200. The sensor component 2214 may include a proximity sensor to detect the presence of a nearby object without any physical contact. The sensor component 2214 may further include an optical sensor, such as a Complementary Metal-Oxide-Semiconductor (CMOS) or Charged Coupled Device (CCD) image sensor which is used in imaging applications. In some examples, the sensor component 2214 may further include an acceleration sensor, a gyroscope sensor, a magnetic sensor, a pressure sensor, or a temperature sensor.

The communication component 2216 is to facilitate wired or wireless communication between the apparatus 2200 and other devices. The apparatus 2200 may access a wireless network that is based on a communication standard, such as Wi-Fi, 2G or 3G, or a combination thereof. In an example, the communication component 2216 receives a broadcast signal or broadcast-associated information from an external broadcast management system via a broadcast channel. In an example, the communication component 2216 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 2200 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above methods.

In an example, there is also provided a non-transitory computer-readable storage medium including instructions, such as a memory 2204 including instructions. The above instructions may be executed by the processor 2220 of the apparatus 2200 to perform the above method of obtaining system information. For example, the non-transitory computer-readable storage medium may be a Read-Only Memory (ROM), a Random Access Memory (RAM), a Compact disc ROM (CD-ROM), a magnetic tape, a floppy disk, and an optical data storage device and so on.

Figure 23:
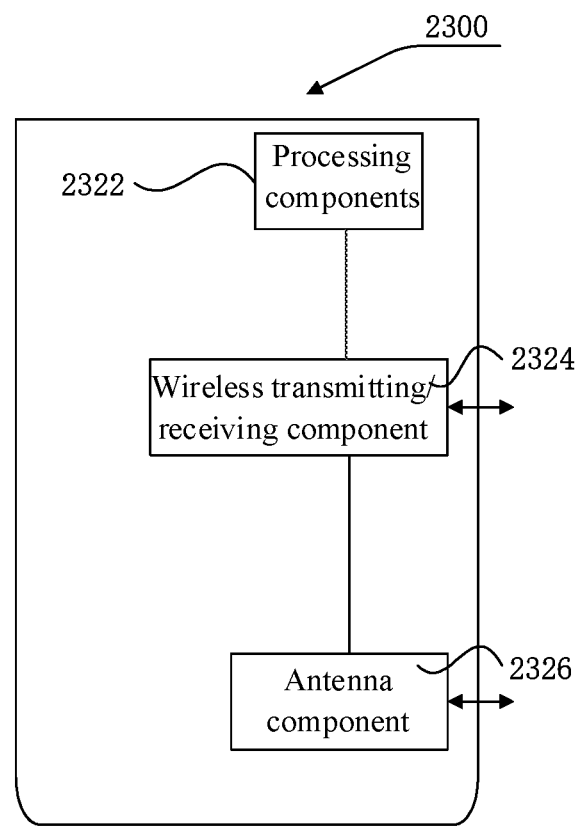
FIG. 23 is a structural diagram of an apparatus for transmitting system information according to an example of the present disclosure.

As shown in FIG. 23, it is a structural diagram of an apparatus 2300 for transmitting system information according to an example. The apparatus 2300 may be provided as a base station. Referring to FIG. 23, the apparatus 2300 includes a processing component 2322, a wireless transmitting/receiving component 2324, an antenna component 2326, and a signal processing component specific to a wireless interface. The processing component 2322 may further include one or more processors.

One of the processing components 2322 may be configured to:

receive a system information request transmitted by shared initiating equipment; and emit a target beam carrying target system information to shared receiving equipment according to the system information request, where the shared receiving equipment at least includes the shared initiating equipment.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of obtaining system information, comprising:
   turning on, by a receiving user equipment (UE), a function of detecting a first target beam under a preset trigger condition, wherein the first target beam is a beam that carries target system information and is emitted by a base station to shared initiating equipment in response to a system information request transmitted by the shared initiating equipment, and the first target beam is emitted to the receiving UE;
   detecting, by the receiving UE, the first target beam before a preset state; and
   obtaining, by the receiving UE, the target system information according to the first target beam when the first target beam is received before the preset state.

2. The method according to claim 1, wherein the preset trigger condition comprises:
   when receiving high-level system information.

3. The method according to claim 1, further comprising:
   transmitting, by the receiving UE, a system information request to the base station when the first target beam is not received before the preset state;
   receiving, by the receiving UE, a second target beam directionally emitted by the base station in response to the system information request transmitted by the receiving UE; and
   obtaining, by the receiving UE, the target system information according to the second target beam.

4. The method according to claim 3, wherein after receiving the second target beam, the method further comprises:
   transmitting, by the receiving UE, reception acknowledgement information to the base station.

5. The method according to claim 1, wherein the preset trigger condition comprises:

when downlink synchronization is successful.

6. An apparatus for obtaining system information, comprising: a processor;

a memory to store instructions executable by the processor;

wherein the processor is configured to:

turn on a function of detecting a first target beam under a preset trigger condition, wherein the first target beam is a beam that carries target system information and is emitted by a base station to shared initiating equipment in response to a system information request transmitted by the shared initiating equipment, and the first target beam is emitted to the apparatus;

detect the first target beam before a preset state; and obtain the target system information according to the first target beam when the first target beam is received before the preset state.

7. The apparatus according to claim 6, wherein the preset trigger condition comprises:

when receiving high-level system information.

8. The apparatus according to claim 6, wherein the processor is further configured to:

transmit a system information request to the base station when the first target beam is not received before the preset state;

receive a second target beam directionally emitted by the base station in response to the system information request transmitted by the apparatus; and obtain the target system information according to the second target beam.

9. The apparatus according to claim 8, wherein after receiving the second target beam, the processor is further configured to:

transmit reception acknowledgement information to the base station.

10. The apparatus according to claim 6, wherein the preset trigger condition comprises:

when downlink synchronization is successful.

* * * * *